United States Patent [19]

Lyons, Jr.

[11] Patent Number: 5,040,269
[45] Date of Patent: Aug. 20, 1991

[54] ATTACHMENT MECHANISM WITH DOUBLE LIP LOCK

[75] Inventor: George W. Lyons, Jr., Madison, Conn.

[73] Assignee: The Bilco Company, West Haven, Conn.

[21] Appl. No.: 490,371

[22] Filed: Mar. 8, 1990

[51] Int. Cl.5 .............................................. E05D 7/12
[52] U.S. Cl. ...................................... 16/272; 16/254; 16/DIG. 43; 403/20; 403/402
[58] Field of Search .......... 16/254, 271, 272, DIG. 43; 29/513; 403/242, 20, 402

[56] References Cited

U.S. PATENT DOCUMENTS

| | | |
|---|---|---|
| 2,309,713 | 2/1943 | Ratkowski ........................... 403/20 |
| 2,423,955 | 7/1947 | Widener . |
| 2,605,925 | 8/1952 | Morin ................................... 16/254 |
| 2,861,659 | 11/1958 | Hagerty et al. ...................... 29/513 |
| 3,292,323 | 12/1966 | Hagan . |
| 3,766,696 | 10/1973 | Totoonchie . |
| 3,802,131 | 4/1974 | Resech . |
| 3,901,613 | 8/1975 | Andersson . |
| 4,336,645 | 6/1982 | Bucci ................................... 403/402 |

OTHER PUBLICATIONS

"Installation Instructions" for Bilco Basement Door, copyright 1984 by The Bilco Company, New Haven, Connecticut 06505.

Primary Examiner—Robert L. Spruill
Assistant Examiner—Carmine Cuda
Attorney, Agent, or Firm—DeLio & Associates

[57] ABSTRACT

A quick assembly attachment mechanism comprising an elongated stud member having two notches formed in its surface and a receiving member that non-rotatably engages the stud member and includes at least two bendable tabs that are bent into the notches to lock the stud against longitudinal motion. The receiving member includes access openings to permit the tabs to be bend back out of the notches so that the stud may be removed. The attachment mechanism is particularly suited for use in connecting steel components such as steel hinges to steel doors.

9 Claims, 2 Drawing Sheets

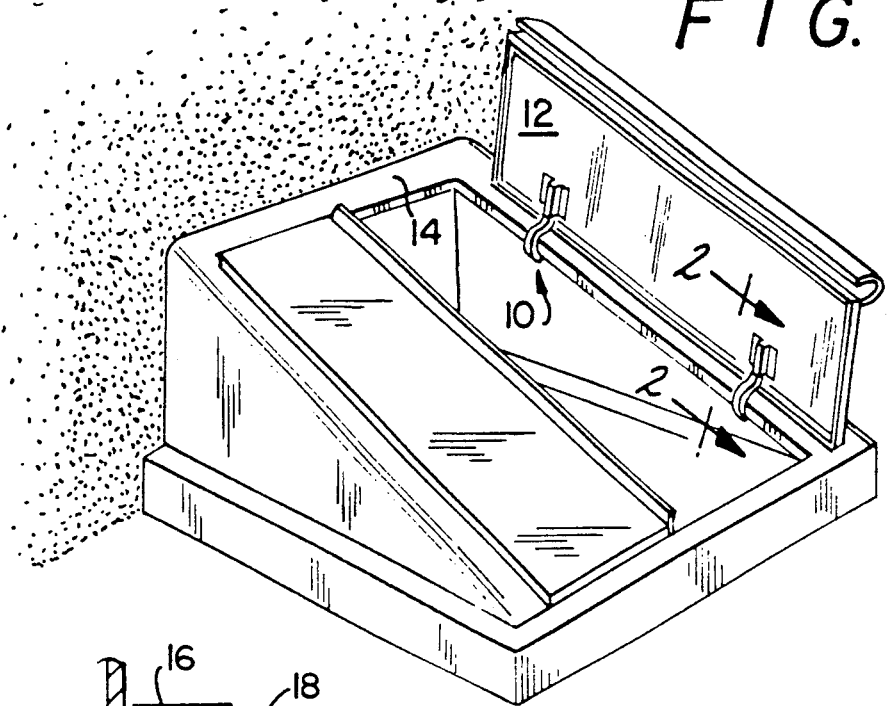
FIG. 1
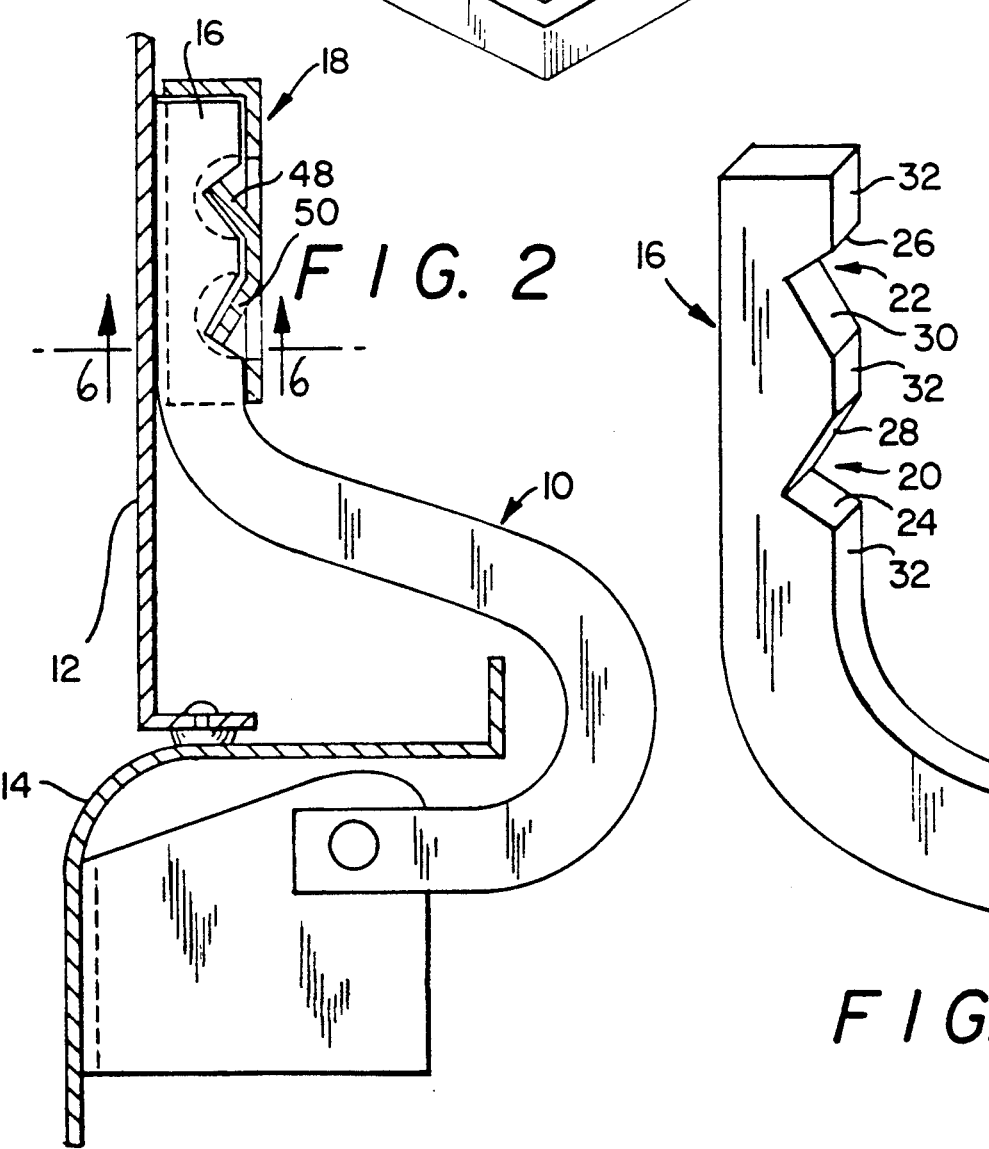
FIG. 2
FIG. 3

ATTACHMENT MECHANISM WITH DOUBLE LIP LOCK

BACKGROUND OF THE INVENTION

I. Field of the Invention

This invention relates to quick assembly attachment mechanisms used for connecting one component to another component without the use of separate fasteners. More particularly, the invention relates to attachment mechanisms employing bendable tabs on a receiving portion of the attachment mechanism to lock a stud portion into position inside the receiving portion.

II. Description of Related Art

In many manufacturing applications, a product must be shipped in disassembled form for subsequent assembly in the field. In such applications, it is desirable to simplify the assembly procedures so that few tools are required for assembly and a minimum number of fasteners must be provided.

Prior art systems for attaching components, particularly for connecting metal components together, have generally relied upon loose fasteners, e.g., bolts with associated washers, lock washers and nuts. Such attachment schemes require that the person assembling the components provide the necessary tools, then locate the correct fasteners and insert them in the correct order and correct direction through the proper holes.

A major problem with this method is that the loose fasteners are often lost during shipment or assembly. Moreover, the manufacturer must carefully count the fasteners, package them to prevent loss during shipment, provide instructions to ensure that they are assembled in the correct order, etc., all of which adds to the cost of the product and the inconvenience of the customer.

A further problem is that the product designer is constrained in his choice of loose fasteners. To avoid the possibility that the customer will have difficulty identifying the correct fastener for the correct application, the designer typically must use identical fasteners in all applications.

Beyond these problems, threaded fasteners are, by their nature, unsuitable for many applications, such as those involving the connection of one moving metal component to another. In such applications, constant use generates shock and/or vibration which tends to loosen conventional fasteners over time, particularly when the fasteners have been installed in the field by an untrained individual.

Accordingly, the present invention seeks to provide an attachment mechanism which avoids these problems of the prior art by eliminating the use of separate fasteners such that the attachment mechanism is provided in two parts which engage one another and are locked into place with bendable tabs.

A second object of the invention is to provide an attachment mechanism which may be assembled with a minimum number of tools, preferably only with a hammer.

Still another object of the invention is to provide an attachment mechanism which is not susceptible to loosening by continued use and vibration.

Yet another object of the invention is to provide an attachment mechanism which is inexpensive to manufacture and may be constructed by bending from sheet metal.

A further object of the invention is to provide an attachment mechanism forming an integral part of a hinge which may be installed in the field and later replaced if damaged.

SUMMARY OF THE INVENTION

The above objects, and other objects which will be apparent to those skilled in the art, are achieved in the present invention which provides a quick assembly attachment mechanism comprising an elongated stud having first and second notches formed in the stud, each notch having an inner surface forming a notch stop surface. A stud receiving member has a receiving channel adapted to non-rotatably engage the stud and includes at least two tabs, each tab including a lip forming a tab stop surface. Each tab is bendably attached to the stud receiving member and is positioned out of the receiving channel prior to bending so as to permit the stud to be inserted into the receiving member. Each tab is located on the receiving member in alignment with the notches on the stud when the stud is fully inserted into the receiving member so that the tabs may be bent into the receiving channel and into the corresponding notches with the tab stop surface from each tab being positioned opposite the corresponding notch stop surface to lock the stud against longitudinal motion relative to the stud receiving member.

In the preferred embodiment, the receiving member includes at least two access openings in side walls of the receiving member which gives access to the underside of the tabs and later permits the tabs to be bent back out of their corresponding notches, thereby freeing the stud for removal. The access openings are preferably also arranged to provide clearance for the head of a hammer to initially bend the tabs into the locking position.

The notches include a second notch surface which preferably intersects the notch stop surface at an angle of ninety degrees of arc. The tabs may then be bent into their respective notches until they contact the second notch surface which positions them in the preferred orientation perpendicular to the notch stop surface.

BRIEF DESCRIPTION OF THE DRAWINGS

FIG. 1 is a perspective view showing a typical application for the quick assembly attachment mechanism of the present invention wherein gooseneck door hinges incorporate the stud member of the attachment mechanism and are attached to a basement entrance door having the receiving member of the attachment mechanism mounted thereon.

FIG. 2 is a side view of the gooseneck hinge in FIG. 1 along the line 2—2, a portion of the receiving member being cut away to show the engagement with the stud portion of the invention more clearly.

FIG. 3 is a perspective view of the elongated stud member integrally formed as part of the gooseneck hinge seen in FIGS. 1 and 2.

DETAILED DESCRIPTION OF THE INVENTION

FIG. 1 shows an assembled and installed basement entrance door of steel in which the double lip lock quick assembly attachment mechanism of the present invention has been used to connect the gooseneck hinges indicated generally at 10 to the doors 12. The attachment of hinges to steel doors is a particularly suitable use for the present invention and accordingly the detailed description of the invention will be made in the context of this application Steel basement entrance doors, such as are shown in FIG. 1, typically use gooseneck hinges for clearance around the weatherproof seals at the edge of the door and frame. This type of hinge, while necessary for the clearance of the door and frame, projects well outward from the door, and leaves it susceptible to damage during shipment. Moreover, the height of the projecting portion of the gooseneck hinge limits the number of doors which may be stacked on a single pallet, increasing storage and shipment costs.

Accordingly, it would be preferable to ship the door with the gooseneck hinges separate from the door for assembly at the job site. Unfortunately, the loose fasteners of the prior art are unsuitable for this use, primarily because they may loosen and fail from the vibration and stress of continued use of the door. Consequently, the gooseneck hinges have heretofore been welded to the door at the factory.

The present invention, in the embodiment shown in FIG. 2, was developed in order to provide a reliable means of attaching the hinges in the field which requires only simple tools. A further advantage lies in the fact that the hinges can be replaced at a later date if they are damaged.

Although the attachment mechanism of this invention is shown in the context of gooseneck hinges for steel doors, it is suitable for use in a wide variety of other applications involving the connection of one component to another.

Figure 4:
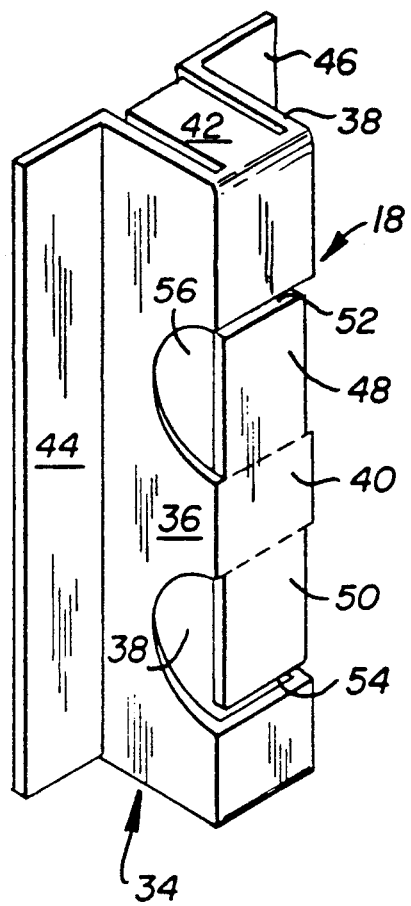
FIG. 4 is a perspective view of the receiving member which receives the stud in FIG. 3.

FIG. 2 shows the assembled relationship between the stud member 16, shown in greater detail in FIG. 3, and the receiving member 18, seen in FIG. 4. In the described gooseneck hinge application, the gooseneck hinge 10 is integrally formed with the elongated stud 16 at one end. The stud 16 includes two notches 20, 22. Each notch includes an inner surface forming a notch stop surface 24, 26. Each notch also includes a second notch surface 28, 30 which intersects the notch stop surface at a preferred angle of 90 degrees of arc or less. For most applications the optimum angle is exactly 90 degrees as discussed below.

Both the notch stop surfaces 26, 24 and the second notch surfaces 28, 30 intersect the upper surface 32 of the stud 16 at an angle of less than 90 degrees. Preferably, the notch stop surfaces 26, 24 intersect the upper surface 32 at a steeper angle than do the second notch surfaces 28, 30.

Referring to FIG. 4, the receiving member 18 has a receiving channel 34 which non-rotatably engages the stud 16 in the manner shown in FIG. 2. The receiving channel 34 is defined by side walls 36, 38, outer wall 40 and a substrate or base, which in this application is the door 12 to which the stud receiving member is attached (see FIG. 5).

Optionally, one end of the receiving member may be closed by end wall 42 so that the stud may be inserted into the receiving channel 34 from only one direction A pair of flanges 44, 46 are attached to the side walls 36, 38 and form a convenient means for mounting the receiving member 18 to the door 12. In the described application, two receiving members 18 are mounted on the doors 12 at the factory by welding the flanges 44, 46 to the door 12.

The notches 20, 22 are positioned on the stud 16 so as to align with the tabs 48, 50 in the outer wall 40 of the receiving member 18 when the stud is fully inserted into the receiving member. Each tab 48, 50 includes a lip forming tab stop surfaces 52, 54.

When the stud 16 is inserted into the receiving member 18, the notches 20, 22 are aligned directly underneath the tabs 48, 50. The tabs 48, 50 are then bent into their corresponding notches 20, 22, usually with a single blow from a hammer. The tab stop surface from each tab ends up positioned to directly face the corresponding notch stop surface. In this manner, one tab acts to lock the stud against longitudinal motion in one direction and the second tab acts to lock the stud against longitudinal motion relative to the receiving member in the other direction.

In the preferred design, with the notch stop surface perpendicular to the second notch surface, the tabs are hammered into their notches until they are flush with the second notch surfaces 28, 30. The second notch surfaces limit the bending of the tabs as they are hammered and stops them when they are at the correct position, exactly perpendicular to the notch stop surfaces With the tabs in this position, longitudinal motion of the stud 16 is resisted by the force of the locking tabs against the respective stop surfaces on the stud. Because the tabs are exactly perpendicular to the stop surfaces, the forces applied via the stud provide no tendency for the tabs to be bent back out of the locking notch.

The notch stop surfaces 26, 28 are preferred to intersect the upper surface 32 of the stud at a steeper angle than the second notch surfaces 28, 30 as this places them more nearly perpendicular to the direction of the longitudinal forces applied by the stud. The remaining non-longitudinal forces exerted by the stud are resisted by the non-rotatable engagement between the stud and the receiving channel.

In order to permit the subsequent disassembly of the attachment mechanism (and for clearance of a large hammer head when the tabs are initially hammered), four access openings 56-62 (see FIG. 7) are provided. The openings permit access to an inner surface of the tabs 48, 50 after the tabs have been bent into the receiving channel so that they may subsequently be bent back out of the receiving channel to free the stud. This is typically accomplished by inserting a screwdriver between the inner surface of the tab and the second notch surface and prying the tab upward.

FIGS. 3 and 4 show perspective views of the two principal portions of the present invention which may be used in any application of the attachment mechanism in which it is desired to quickly and reliably connect one component to another.

Figure 5:
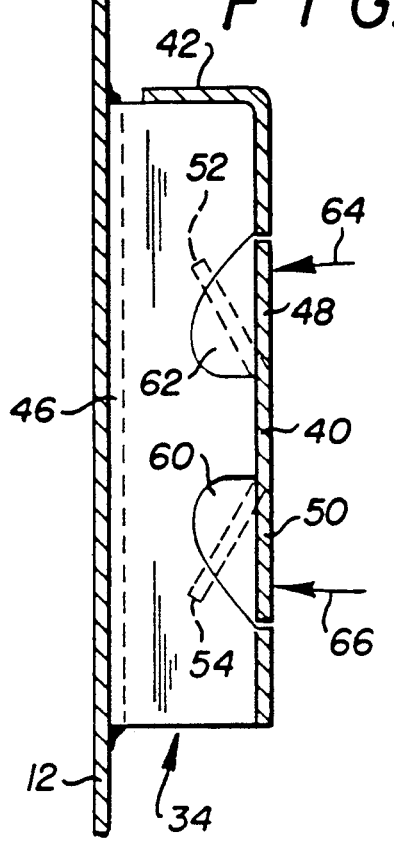
FIG. 5 is a cross sectional view of the receiving member along the longitudinal axis thereof.

FIG. 5 shows a cross sectional view of the receiving member 18 along its longitudinal axis. The tabs 48, 50 are shown in their position prior to bending which permits the stud to be inserted into the receiving channel. Arrows 64, 66 indicate the direction in which the tabs are bent, with their final positions being indicated by dashed lines. The lips of each tab which form the tab stop surfaces 52, 54 and the manner in which they act against the notch stop surfaces are best seen in this view.

Figure 6:
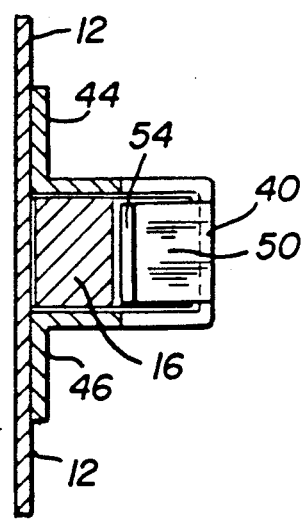
FIG. 6 is a cross sectional view of the receiving member along a section taken perpendicular to the longitudinal axis of the receiving member pursuant to the line 6—6 in FIG. 2.

FIG. 6 is a cross sectional view perpendicular to the longitudinal axis of the stud and receiving member along the line 6—6 of FIG. 2 with the stud 16 inserted into the receiving channel, and the tabs 48, 50 bent into their corresponding notches. The door 12 forms a substrate to which the flanges 44,46 are attached by welding or any other conventional means.

Figure 7:
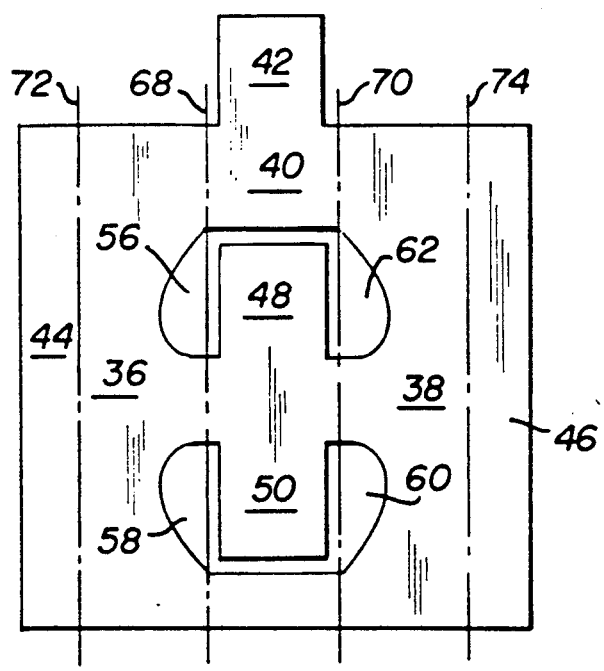
FIG. 7/shows a plan view of a sheet metal blank prior to bending to form the receiving member of FIG. 4.

The receiving member 18 is preferably formed by bending it to shape from an initially flat sheet metal blank such as is shown in FIG. 7. The blank may be shaped by punching it from sheet metal stock, followed by bending. The outer wall 40 is located between two side wall bend lines 68, 70. The side walls 36, 38 are located between the side wall bend lines 68, 70 and flange bend lines 72, 74, with the flanges 44, 46 being located on the opposite sides of the flange bend lines 72, 74.

The tabs 48, 50 are preferably located between the bend lines 68, 70 and are of sufficient size to extend substantially across the full width of outer wall 40.

The force required to bend the bendable tabs 48, 50 may be adjusted by varying the thickness of the sheet metal and by increasing or decreasing the length of the portion of their perimeter attached to the outer wall 40.

It will thus be seen that the objects set forth above, among those made apparent from the preceding description, are efficiently attained and, since certain changes may be made in the above embodiments without departing from the spirit and scope of the invention, it is intended that all matter contained in the above description shall be interpreted as illustrative and not in a limiting sense.

I claim:

1. A quick-assembly attachment mechanism comprising:
   an elongated stud member having an outer surface with first and second notches formed therein, each notch having an inner surface forming a notch stop surface inclined at an angle to the outer surface of the stud member; and
   a receiving member having a receiving channel adapted to non-rotatably engage the stud member, the receiving member including:
   an outer wall,
   two side walls connected to the outer wall,
   first and second tabs adapted for bending into the corresponding first and second notches, each tab including a lip forming a tab stop surface, each tab being bendably attached to the receiving member as an integral part of the outer wall and positioned out of the receiving channel prior to bending of the tabs to permit the stud to be inserted into the receiving member, the tabs being located in alignment with their respective notches with the stud member inserted into the receiving member, and the tab stop surface from each tab being positioned opposite its corresponding notch stop surface after bending of the tabs to lock the stud member against longitudinal motion relative to the receiving member, and
   at least one of the side walls including at least two access openings adjacent to the outer wall and opposite corresponding tabs.

2. A quick-assembly attachment mechanism according to claim 1 wherein the receiving member includes an end wall positioned to prevent insertion of the stud member form one direction and allow insertion from a second direction.

3. A quick-assembly attachment mechanism according to claim 1 wherein the receiving member includes a pair of opposed flanges for attachment of the receiving member to a substrate.

4. A quick-assembly attachment mechanism according to claim 1 wherein the notches include a second notch surface intersecting the notch stop surface at an angle of about ninety degrees of arc or less.

5. A quick-assembly attachment mechanism according to claim 4 wherein the second notch surface and the notch stop surface intersect the outer surface of the stud member at an angle of less than ninety degrees of arc.

6. A quick-assembly attachment mechanism according to claim 5 wherein the second notch surface of each notch is planar and the tabs are substantially parallel to and in contact with the second notch surface in their corresponding notch after bending.

7. A quick-assembly attachment mechanism according to claim 6 wherein the second notch surface of each notch forms an angle of ninety degrees of arc with its corresponding notch stop surface.

8. A quick-mount hinge comprising:
   a first hinge member having one end adapted for hinged connection, and the other end terminating in an integral elongated stud having an outer surface with first and second notches formed therein, each notch having an inner surface forming a notch stop surface inclined at an angle to the outer surface of the stud;
   a second hinge member including means for hinged connection to the first hinge member and means for fixed connection to a first component; and
   a receiving member having a receiving channel adapted to non-rotatably engage the stud, the receiving member including first and second tabs adapted for bending into the corresponding first and second notches, each tab including a lip forming a tab stop surface, each tab being bendably attached to the receiving member and positioned out of the receiving channel prior to bending of the tabs to permit the stud to be inserted into the receiving member, the tabs being located in alignment with their respective notches with the stud inserted into the receiving member and the tab stop surface from each tab being positioned opposite its corresponding notch stop surface after bending of the tabs to lock the stud against longitudinal motion relative to the receiving member, the receiving member including a side wall having at least two access openings aligned with the tabs and positioned to permit a tool to be inserted into the access openings to bend the tabs out of the corresponding notches.

9. A quick-mount hinge according to claim 2 wherein the receiving member includes a second side wall having a second access opening aligned with a tab to allow the tab to be bent out of its corresponding notch.

* * * * *

UNITED STATES PATENT AND TRADEMARK OFFICE
CERTIFICATE OF CORRECTION

PATENT NO. : 5,040,269

DATED : August 20, 1991

INVENTOR(S) : George Lyons, Jr.

It is certified that error appears in the above-identified patent and that said Letters Patent is hereby corrected as shown below:

On the title page:

In the abstract, line 7 "bend", should read --bent--.

Column 2, line 67, "FIG. 7/" should read --FIG. 7--.

Column 4, line 33, insert a period at the end of the sentence after the word "surfaces".

Column 6, line 7, in claim 2, "form" should read --from--.

Signed and Sealed this

Sixth Day of April, 1993

Attest:

STEPHEN G. KUNIN

*Attesting Officer*    Acting Commissioner of Patents and Trademarks